United States Patent
Uchida et al.

(10) Patent No.: US 9,849,827 B2
(45) Date of Patent: Dec. 26, 2017

(54) VEHICLE HEADLIGHT SYSTEM

(71) Applicant: Stanley Electric Co., Ltd., Tokyo (JP)

(72) Inventors: Mitsuhiro Uchida, Tokyo (JP);
Yoshiaki Nakazato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 59 days.

(21) Appl. No.: 15/140,244

(22) Filed: Apr. 27, 2016

(65) Prior Publication Data
US 2016/0339833 A1 Nov. 24, 2016

(30) Foreign Application Priority Data
May 22, 2015 (JP) .................. 2015-104348

(51) Int. Cl.
*B60Q 1/08* (2006.01)
*B60Q 1/14* (2006.01)
(Continued)

(52) U.S. Cl.
CPC ............. *B60Q 1/085* (2013.01); *B60Q 1/143* (2013.01); *B60Q 1/1438* (2013.01); *F21S 48/115* (2013.01); *F21S 48/1145* (2013.01); *F21S 48/125* (2013.01); *F21S 48/1388* (2013.01); *F21S 48/1742* (2013.01); *F21S 48/1773* (2013.01); *F21S 48/1784* (2013.01); *F21S 48/325* (2013.01); *B60Q 2300/056* (2013.01); *B60Q 2300/112* (2013.01); *B60Q 2300/122* (2013.01); *B60Q 2300/42* (2013.01);
(Continued)

(58) Field of Classification Search
CPC ..................................... B60Q 1/085

USPC ......................................... 362/466
See application file for complete search history.

(56) References Cited

U.S. PATENT DOCUMENTS

| 2009/0231866 A1* | 9/2009 | Yamamura | B60Q 1/085 362/466 |
| 2015/0009694 A1* | 1/2015 | Sekiguchi | F21S 48/1154 362/466 |

(Continued)

FOREIGN PATENT DOCUMENTS

| JP | 2010-49861 A | 3/2010 |
| JP | 2013-152812 A | 8/2013 |
| JP | 5262057 B2 | 8/2013 |

*Primary Examiner* — Michael G Lee
*Assistant Examiner* — David Tardif
(74) *Attorney, Agent, or Firm* — Kenealy Vaidya LLP

(57) ABSTRACT

A vehicle headlight system can include a headlight controller and a lamp unit incorporating a high beam module, which can emit favorable marking lights while the headlight controller associates each of a shading driver and a swivel structure with a shading width setter and a swivel setter, respectively. When a forward vehicle does not exist in a forward direction, the headlight systems can provide favorable light distribution patterns by overlapping the light distribution pattern projected from the high beam module with each of light distribution patterns for a high and low beam. When the forward vehicle exists, the headlight system can prevent the lamp unit from emitting a glare type light to the forward vehicle. Thus, the disclosed subject matter can provide vehicle headlight systems, which can emit favorable light patterns toward a pedestrian as a marking light, and which can provide favorable light distribution patterns to drive at night.

10 Claims, 7 Drawing Sheets

(51) Int. Cl.
*F21S 8/10* (2006.01)
*F21Y 101/02* (2006.01)

(52) U.S. Cl.
CPC ...... *B60Q 2300/45* (2013.01); *B60Q 2400/50* (2013.01); *F21Y 2101/02* (2013.01)

(56) References Cited

U.S. PATENT DOCUMENTS

2015/0055357 A1* 2/2015 Nakatani ................ B60Q 1/143
362/466
2015/0241013 A1* 8/2015 Mochizuki .......... F21S 48/1721
362/466

* cited by examiner

Turning direction

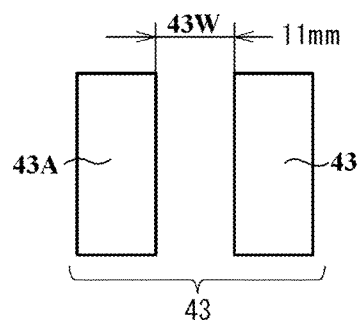 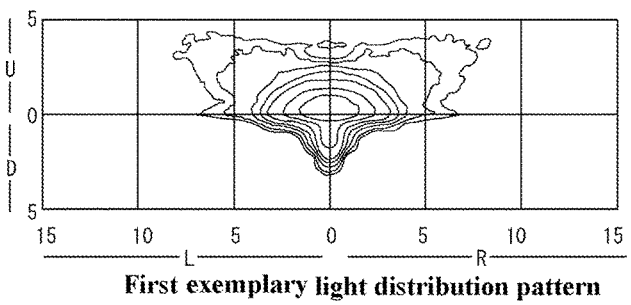
FIG. 4a
First exemplary light distribution pattern
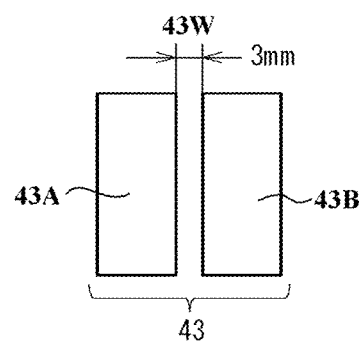 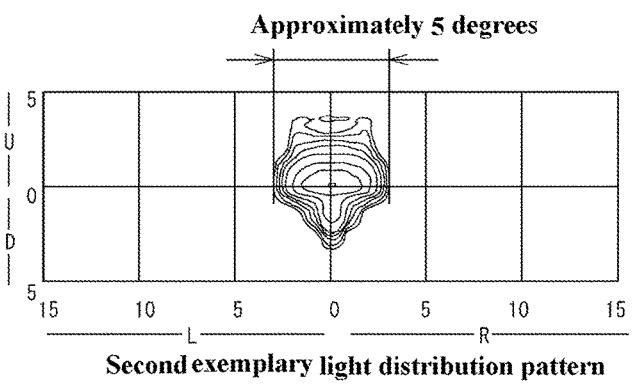
FIG. 4b
Second exemplary light distribution pattern
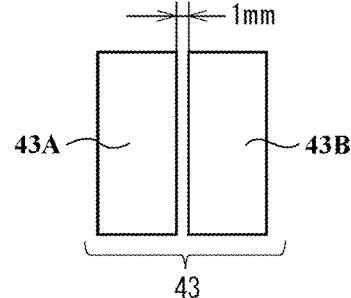 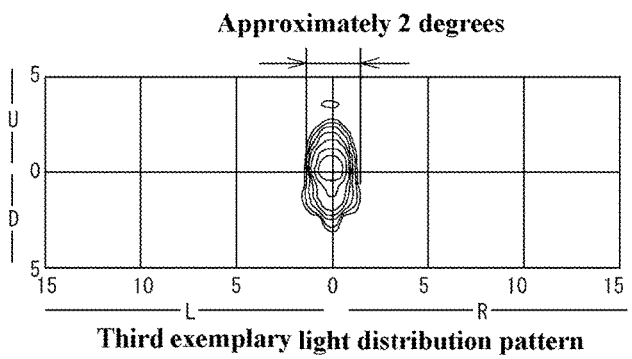
FIG. 4c
Third exemplary light distribution pattern

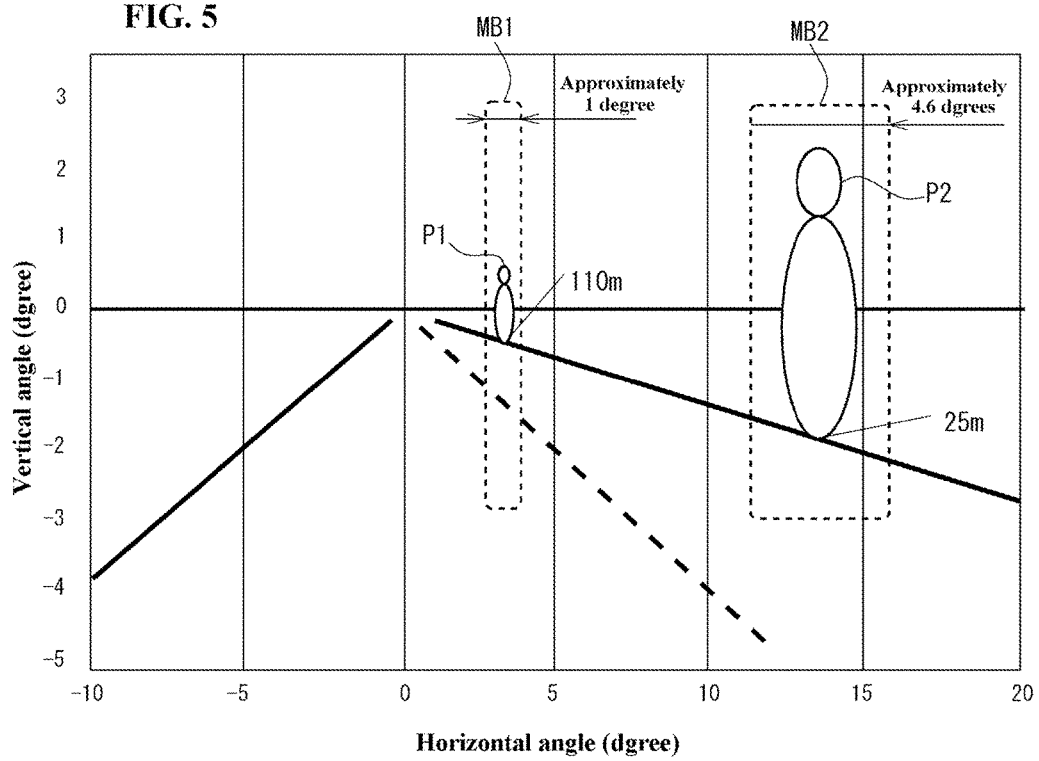

VEHICLE HEADLIGHT SYSTEM

This application claims the priority benefit under 35 U.S.C. §119 of Japanese Patent Application No. 2015-104348 filed on May 22, 2015, which is hereby incorporated in its entirety by reference.

BACKGROUND

1. Field

The presently disclosed subject matter relates to vehicle headlight systems, and more particularly to vehicle headlight systems including a high beam module used as a marking lamp to alert drivers to an existence of pedestrian in a forward direction of a subject vehicle, and also the vehicle headlight systems having favorable light distribution patterns, which can be easy to drive at night, and which can prevent a lamp unit including the high beam module from emitting a glare type light to oncoming vehicles on an oncoming traffic lane and forward vehicles moving forward on a driving lane.

2. Description of the Related Art

When at least one pedestrian (including people cycling) exists in a forward direction of a vehicle while drivers steer the vehicle, an optical technology in which the drivers are alerted by marking the pedestrian with a light-emission in a direction toward the pedestrian has be known. For example, a conventional alerting light-emitting apparatus is disclosed Patent document No. 1 (Japanese Patent No. 5,262,057). FIG. 7a is a block diagram showing the conventional alerting light-emitting apparatus disclosed in Patent document No. 1, and FIG. 7b is an explanatory view showing a light-emitting pattern projected by the conventional alerting light-emitting apparatus.

The conventional alerting light-emitting apparatus 100 includes: a camera 120 configured to photograph a space as image data in a forward direction of a subject vehicle using the apparatus 100; a human detector 130 configured to detect a pedestrian from the image data output from the camera 120; a distance sensor 140 configured to detect a distance from the subject vehicle to the pedestrian detected by the human detector 130; a rudder angle sensor 150 configured to detect a direction of the pedestrian with respect to the subject vehicle; a speed sensor 160 configured to detect a moving speed of the subject vehicle; and a dangerous extent detector 170 configured to detect a dangerous extent of the pedestrian as human data with respect to the subject vehicle according to the detected pedestrian, the distance between the pedestrian and the subject vehicle, the direction of the pedestrian and the moving speed of the subject vehicle.

In addition, the conventional alerting light-emitting apparatus 100 also include a variable light 180 configured to emit light in a direction toward the pedestrian while the light shows the distance between the pedestrian and the subject vehicle; and a lighting driver 175 configured to emit the light from the variable light 180 in accordance with a light-emitting signal output from the dangerous extent detector 170, when the dangerous extent detector 170 judges a dangerous case from the human data.

When the conventional alerting light-emitting apparatus 100 detects a pedestrian 500 from the human detector 130 via the image data from the camera 120, the alerting light-emitting apparatus 100 may project an alerting light-emitting pattern 400 in a direction toward the pedestrian 500. In this case, the alerting light-emitting pattern 400 may alert a driver of the subject vehicle incorporating the alerting light-emitting apparatus 100 that a directional light-emitting 450 informs about a direction toward the pedestrian 500 and a distance light-emitting pattern 420 informs about the distance from the subject vehicle to the pedestrian 500.

However, when the conventional alerting light-emitting apparatus 100 generates the alerting light-emitting pattern 400, the alert light-emitting pattern 400 is formed in a spot-light shape. Hence, when the conventional alerting light-emitting apparatus 100 detects the pedestrian 500, which is located in a direction toward a relative large angle with respect to a moving direction of the subject vehicle, for example, which is located in a forward direction of the subject vehicle moving on a curved road, it may be very difficult for the alerting light-emitting apparatus 100 to accurately project the alerting light-emitting pattern 400 toward the pedestrian 500. The above-described main reason why is that the conventional alerting light-emitting apparatus 100 may be separated from a headlight including a high beam and a low beam.

The above-referenced Patent Documents and additional Patent Documents are listed below and are hereby incorporated with their English abstracts and specification in their entireties.

1. Patent Document No. 1: Japanese Patent No. 5,262,057
2. Patent Document No. 2: Japanese Patent Application Laid Open JP 2010-49861
3. Patent Document No. 3: Japanese Patent Application Laid Open JP 2013-152812

The disclosed subject matter has been devised to consider the above and other problems, characteristics and features. Thus, exemplary embodiments of the disclosed subject matter can include vehicle headlight systems using a headlight controller and a lamp unit including a high beam module, which can emit favorable light distribution patterns toward at least one pedestrian as a marking light to alert drivers to an existence of pedestrian in a forward direction of a subject vehicle.

In addition, when the pedestrian and at least one forward vehicle do not exist in the forward direction of the subject vehicle, the vehicle headlight system can also provide favorable light distribution patterns to safely drive at night by overlapping a light distribution pattern projected from the high beam module with each of the light distribution patterns for a high beam and a low beam. When the at least one forward vehicle exists in the forward direction of the subject vehicle, the vehicle headlight system can prevents the lamp unit from emitting a glare type light to oncoming vehicles and vehicles moving forwards in the forward direction of the subject vehicle.

SUMMARY

The presently disclosed subject matter has been devised in view of the above and other characteristics, desires, and problems in the conventional art. An aspect of the disclosed subject matter can provide vehicle headlight systems, which can emit favorable light distribution patterns toward at least one pedestrian as a marking light to alert drivers to an existence of pedestrian in a forward direction of a subject vehicle, and which can provide favorable light distribution patterns that can be easy to drive at night for not only the subject vehicle but also vehicles traveling in a forward direction of the subject vehicle by utilizing the characteristics of a headlight controller and a optical unit.

According to an aspect of the disclosed subject matter, a vehicle headlight system can include a lamp unit including a high beam module, and configured to be attached to a right and left front of a subject vehicle, and the high beam module including: a projector lens having a first focus located on substantially an optical axis of the projector lens; a light source configured to emit light, and located on substantially the optical axis of the projector lens, wherein the first focus of the projector lens is located between the light source and an incident surface of the projector lens; a first reflector configured to reflect the light emitted from the light source toward the first focus of the projector lens; a movable shade extending from substantially the first focus of the projector lens in a direction of the first reflector at a substantially right angle with respect to the optical axis of the projector lens, and including a first shading plate, a second shading plate and a shading width located the first shading plate and the second shading plate, and configured to vary the shading width; a first supporter connecting the projector lens, the light source, the first reflector and the movable shade; and a rotary shaft included in the first supporter, and an extension of the rotary shaft intersecting with the optical axis of the projector lens at a substantially right angle.

In addition, the vehicle headlight system can also include: a camera being located adjacent the subject vehicle, configured to photograph at least one pedestrian and at least one forward vehicle located in a frontward direction of the subject vehicle, and the camera being configured to output the pedestrian and the vehicle photographed by the camera as image data; an image processing circuit configured to detect the pedestrian and the forward vehicle in accordance with the image data output from the camera, configured to generate human locating data of the pedestrian and vehicle locating data of the forward vehicle with respect to an optical axis of the camera, and being configured to output the human locating data and the vehicle locating data vehicle as human data and vehicle data, respectively; and a system controller.

The system controller can include: a pedestrian detector configured to input the human data output from the image processing circuit, and configured to determine whether the at least one pedestrian exists or not in accordance with the human data; a forward vehicle detector configured to input the vehicle data output from the image processing circuit, and configured to determine whether the at least one forward vehicle exists or not in accordance with the vehicle data; a swivel setter configured to configured to input the human data output from the image processing circuit, configured to determine a turning angle of the rotary shaft of the high beam module as swivel data in accordance with the human data, and configured to output the swivel data; a shading width setter configured to configured to input the human data output from the image processing circuit, configured to determine the shading width of the movable shade as shading data in accordance with the human data, and configured to output the shading data; and a light-emitting controller configured to input a rudder signal, a speed signal and a switching signal output from the subject vehicle, configured to generate a light-emitting driving signal in accordance with the rudder, the speed signal and the switching signal, and configured to output a light-emitting driving signal to the lamp unit.

In addition, the vehicle headlight system can also include: a swivel structure configured to input the swivel data output from the swivel setter of the system controller, and configured to rotate the rotary shaft of the high beam module of the lamp unit in accordance with the swivel data; and a shading driver configured to input the shading data output from the shading width setter, and configured to set up the shading width of the movable shade of the high beam module of the lamp unit.

In the above-described exemplary vehicle headlight system, the headlight system can further include a second reflector included in the high beam module, formed in a substantially reflective elliptical surface having a first focus and a second focus, configured to gather the light emitted from the light source at substantially the first focus of the projector lens by locating the first focuses thereof at substantially the light source and by locating the second focus thereof at substantially the first focus of the projector, and located outer side of the first reflector of the high beam module so as to surround the first reflector, and also can further include a low beam lamp and a high beam lamp included in the lamp unit.

In the above-described exemplary vehicle headlight system, the shading width setter can narrow the shading width of the movable shade of the high beam module with an increasing relative distance of a pedestrian output from the image processing circuit with respect to the subject vehicle, and the camera can be a color camera, which photographs color image data. The light source of the high beam module can include at least one of a laser chip and at least one light-emitting diode and a wavelength converting material, and the optical axis of the camera can be located in a substantially parallel direction with each of the optical axes of the projector lenses of the high beam modules, which are attached to a right and left front of the subject vehicle.

Moreover, in the above-described exemplary vehicle headlight system, when the system controller detects that the pedestrian and the forward vehicle do not exist in the forward direction of the subject vehicle, the lamp unit can overlap a light distribution pattern projected from the high beam module with light emitted from either the high beam lamp or the low beam lamp, and in this case when the system controller detects that a vehicle speed of the subject vehicle is slower than a predetermined speed, the lamp unit can stop the high beam module from emitting. When the system controller detects that the forward vehicle exist in the forward direction of the subject vehicle, the lamp unit can also stop the high beam module from emitting.

According to the aspect of the disclosed subject matter, the vehicle headlight system can emit favorable light distribution patterns as a marking light while the system controller associates the shading driver with the shading width setter by using the high beam module so that the marking light narrows with increasing distance from the subject vehicle to the pedestrian, and also can accurately emit the favorable light distribution patterns as the marking light toward the pedestrian by turning the high beam module in the horizontal direction using the swivel structure Furthermore, when the pedestrian and the forward vehicle do not exist in the forward direction of the subject vehicle, the vehicle headlight systems can also provide favorable light distribution patterns to safely drive at night by overlapping the light distribution pattern projected from the high beam module with each of the light distribution patterns for the high beam and the low beam. When the at least one forward vehicle exists in the forward direction of the subject vehicle, the vehicle headlight system can prevent the lamp unit from emitting a glare type light to the forward vehicle in the forward direction of the subject vehicle.

Thus, the disclosed subject matter can provide vehicle headlight systems, which can emit favorable light distribution patterns toward at least one pedestrian as the marking light to alert drivers to an existence of pedestrian in the forward direction of the subject vehicle, and which can provide favorable light distribution patterns that can be easy to drive at night for not only the subject vehicle but also vehicles traveling in the forward direction of the subject vehicle by utilizing the characteristics of the headlight controller and the optical unit.

BRIEF DESCRIPTION OF THE DRAWINGS

These and other characteristics and features of the disclosed subject matter will become clear from the following description with reference to the accompanying drawings, wherein:

FIG. 3b is a rear view depicting the exemplary structure of the high beam module shown in FIG. 3a;

FIGS. 4a, 4b and 4c are explanatory diagrams depicting relations between each of shading widths of 11 millimeters, 3 millimeters and 1 millimeter of a movable shade and exemplary light distribution patterns, respectively.

FIG. 5 is an explanatory diagram depicting exemplary light distribution patterns used as a marking light;

DETAILED DESCRIPTION OF EXEMPLARY EMBODIMENTS

Figure 1:
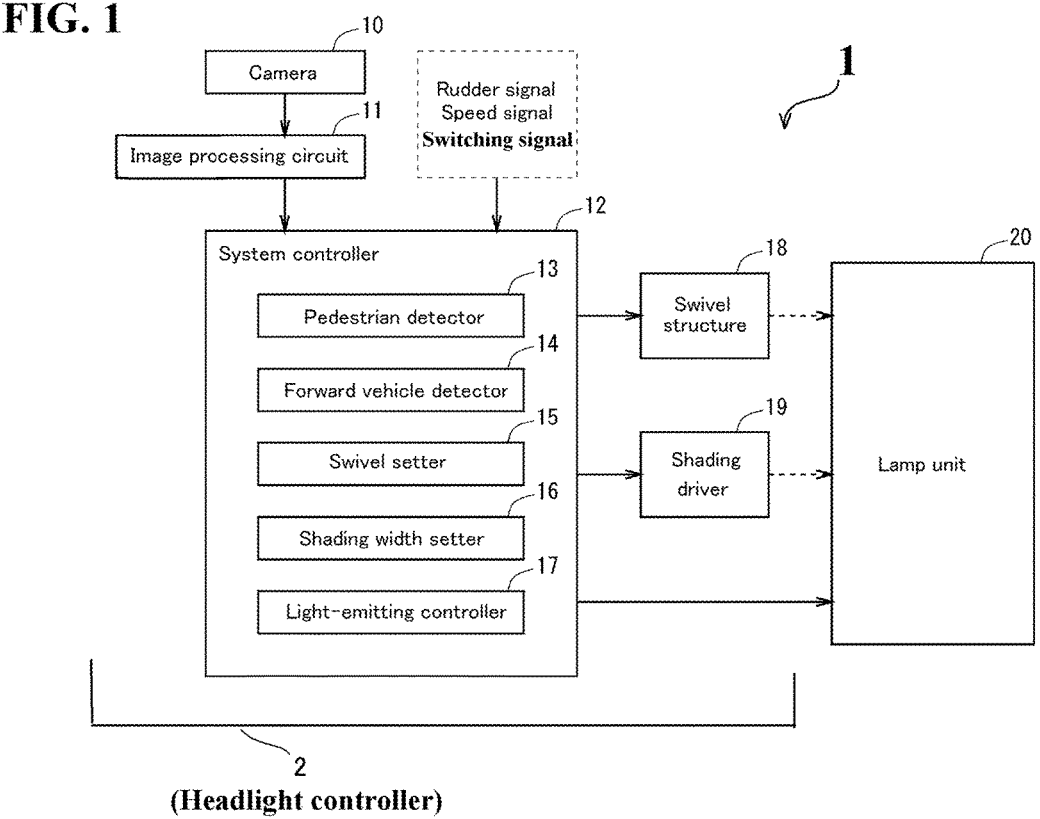
FIG. 1 is a block diagram showing an exemplary embodiment of a vehicle headlight system including a headlight controller and a lamp unit made in accordance with principles of the disclosed subject matter.

The disclosed subject matter will now be described in detail with reference to FIG. 1 to FIG. 6. FIG. 1 is a block diagram showing an exemplary embodiment of a vehicle headlight system including a headlight controller and a lamp unit made in accordance with principles of the disclosed subject matter. The vehicle headlight system 1 can include the headlight controller 2 and the lamp unit 20, which includes a right lamp unit and a left lamp unit attached to each of a right front and a left front of a subject vehicle incorporating the headlight controller 2, respectively.

The headlight controller 2 can include a camera 10 having an optical axis CA located at a predetermined position in a forward direction of the subject vehicle (e.g., close to a vehicle interior mirror), photographing an objective space in the forward direction of the subject vehicle 30, configured to photograph at least one pedestrian including at least one cycler cycling and at least one forward vehicle 31 (at least one oncoming vehicle and at least one forward vehicle moving in a forward direction of the subject vehicle), which are located in the forward direction of the subject vehicle 30, and the camera 10 configured to output the at least one pedestrian and at least one vehicle photographed by the camera 10 as image data.

In addition, the headlight controller 2 can also include an image processing circuit 11 configured to detect the at least one pedestrian and at least one forward vehicle in accordance with the image data output from the camera 10, configured to generate human locating data including a location and a relative distance of the at least one pedestrian with respect to the optical axis CA of the camera 10, configured to generate vehicle locating data including a location of the at least one forward vehicle 31 with respect to the optical axis CA of the camera 10, configured to output the human locating data as human data, and being configured to output the vehicle locating data as vehicle data. The headlight controller 2 can also include a system controller 12 configured to receive the human data and the vehicle data output from the image processing circuit 11, and configured to output a light-emitting driving signal to the lamp unit 20.

As the camera 10, a charge coupled device (CCD) camera in which CCDs are arranged in a matrix array shape, a complementary metal-oxide semiconductor (CMOS) in which CMOSs are arranged in a matrix array shape and the like can be used to photograph the objective space in the forward direction of the subject vehicle. These cameras are generally provided with a projector lens to focus the objective space on each of the CCDs and the CMOSs and to protect each of the CCDs and the CMOSs from an external environment. The optical axis CA of the camera 10 can correspond to an optical axis of the projector lens.

The image processing circuit 11 can include a computer system including a central processing unit (CPU), a read-only memory (ROM), a random access memory (RAM) and the like, and can be operated to extract the at least one pedestrian and the at least one vehicle included in the image data output from the camera 10 by running a program from the ROM while using the camera 10. In this case, the image processing circuit 11 can detect only the at least one pedestrian and the at least one forward vehicle by a geometric feature extraction and the like. When the image processing circuit 11 detects the at least one forward vehicle 31, the image processing circuit 11 can also detect at least one of a headlight, a taillight, a stop lamp, a position lamp and the like as one of the at least one forward vehicle by an optical feature extraction, etc.

The system controller 12 of the headlight controller 2 can includes: a pedestrian detector 13 configured to receive the human data output from the image processing circuit 11, and configured to determine whether the at least one pedestrian exists or not in accordance with the human data; a forward vehicle detector 14 configured to receive the vehicle data output from the image processing circuit 11, and configured to determine whether the at least one forward vehicle 31 exists or not in accordance with the vehicle data; and a swivel setter 15 configured to receive the human data output from the image processing circuit 11, configured to determine a turning angle in a horizontal direction of the lamp unit 20 as swivel data in accordance with the human data, and configured to output the swivel data to a swivel structure 18.

In addition, the system controller 12 can also include: a shading width setter 16 configured to configured to receive the human data output from the image processing circuit 11, configured to determine a shading width of a movable shade included in a high beam module 22 as shading data in accordance with the human data, and configured to output the shading data to a shading driver 19; and a light-emitting controller 17 configured to receive information such as a rudder signal, a speed signal and a switching signal output from the subject vehicle 30, configured to generate the light-emitting driving signal in accordance with the information, and configured to output the light-emitting driving signal to the lamp unit 20.

The above-described system controller 12 can include a computer system including a central processing unit (CPU), a read-only memory (ROM), a random access memory (RAM) and the like, and can be operated to extract the human data and the vehicle data output from the image processing circuit 11 and to utilize the rudder signal, the speed signal and the switching signal output from the subject vehicle by running a program from the ROM while using the camera 10. Accordingly, the system controller 12 can operate the pedestrian detector 13, the forward vehicle detector 14, the swivel setter 15, the shading width setter 16 and the light-emitting controller 17 to drive the lamp unit 20 in an appropriate manner by using the swivel structure 18 and the shading driver 19 as appropriate.

Figure 2A:
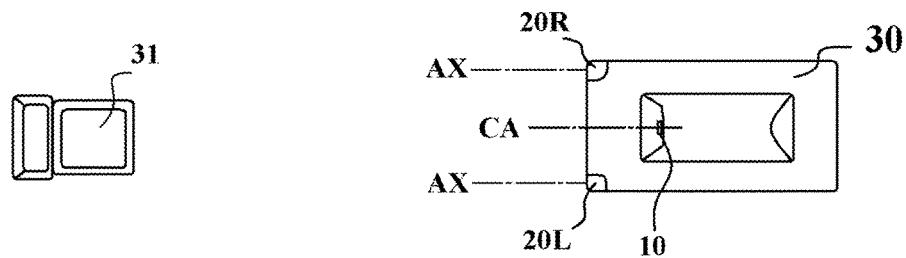
FIG. 2a is an explanatory diagram showing an exemplary lamp unit and an exemplary camera attached to a subject vehicle incorporating the vehicle headlight system shown in FIG. 1, and FIGS. 2b and 2c are explanatory diagrams of exemplary left lamp units of the lamp unit, respectively.

FIG. 2a is an explanatory diagram showing an exemplary lamp unit and an exemplary camera attached to a subject vehicle incorporating the vehicle headlight system shown in FIG. 1. The camera 10 can be attached to the predetermined position in the forward direction of the subject vehicle 30 to photograph the forward vehicle 31, and the optical axis CA of the camera 10 can be directed in a substantially straight-driving direction of the subject vehicle 30, and also can be located in a substantially parallel direction with each of optical axes of projector lenses of the high beam modules 22 attached to the right and left front of the subject vehicle 30 as described in detail later with reference to FIG. 3a.

The lamp unit 20 can includes a right lamp unit 20R and a left lamp unit 20L attached to each of a right front and a left front of the subject vehicle 30 incorporating the vehicle headlight system 1, respectively. The right lamp unit 20R of the lamp unit 20 is substantially symmetrical to the left lamp unit 20L. Accordingly, the left lamp unit 20L will now be described, and the right lamp unit 20R will be abbreviated here.

Figure 2B:
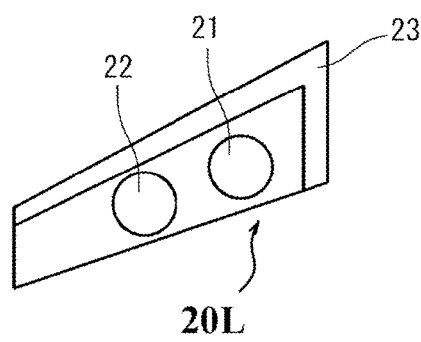
Figure 2C:
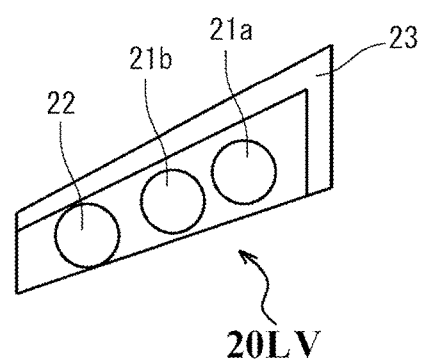

The left lamp unit 20L of the lamp unit 20 can include a combination lamp 21 including a light-emitting structure for a high beam and a low beam, the above-described high beam module 22 to emit an additional high beam and a width indicator 23 as shown in FIG. 2b. As an exemplary variation of the left lamp unit 20L, a left lamp unit 20LV including a high beam lamp 21a, a low beam lamp 21b, the above-described high beam module 22 to emit the additional high beam and the width indicator 23 can also be used, as shown in FIG. 2c.

The high beam module 22 for emitting the additional high beam can vary a light-emitting width thereof. For example, the high beam module 22 can narrow the light-emitting width thereof, and thereby can emit a light distribution pattern having a narrow light-emitting width as a marking light toward a pedestrian. The high beam module 22 can be turned in the horizontal direction thereof by the swivel structure 18 in accordance with the turning angle output from the system controller 12, and thereby light emitted from the high beam module can be changed in an intended horizontal direction thereof. As the swivel structure 18, for example, swivel structures disclosed in Patent document No. 2, which is owned by Applicant of this disclosed subject matter, can be employed.

Figure 3A:
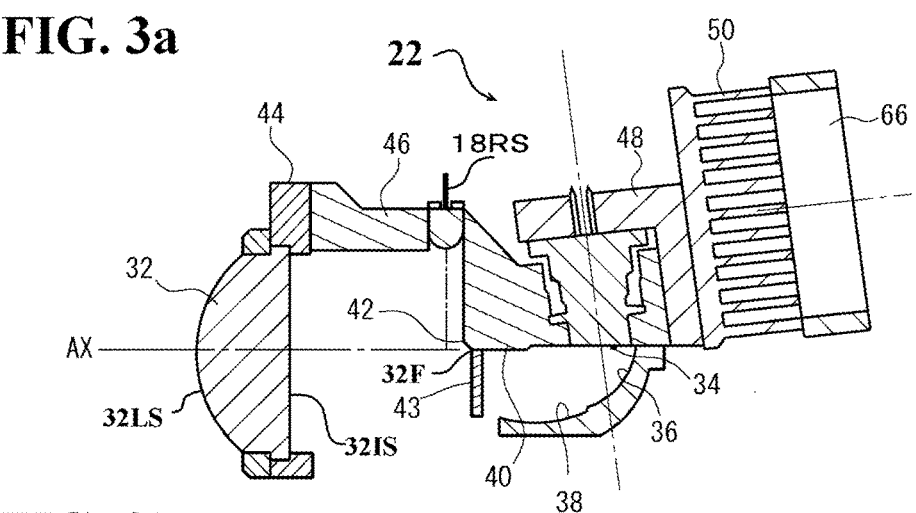
FIG. 3a is a schematic cross-sectional view depicting an exemplary structure of a high beam module included in the left lamp unit shown in FIGS. 2a and 2b.
Figure 3B:
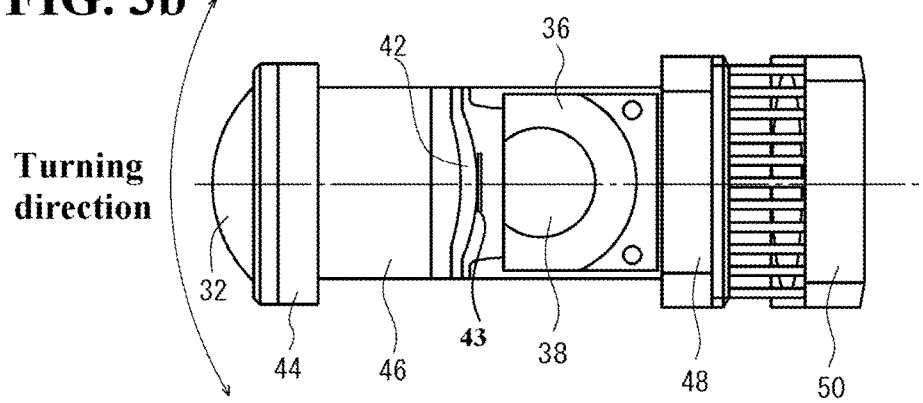

The high beam module 22 including the shading width 43W of the movable shade 43 can be controlled by the shading driver 19 in accordance with the shading data output from the shading width setter 16. The shading driver 19 can vary the shading width 43W of the movable shade 43, and can emit favorable light distribution patterns as the marking light while the system controller 12 associates the shading driver 19 with the shading width setter 16 therein by using the high beam module 22. FIG. 3a is a schematic cross-sectional view depicting an exemplary structure of the high beam module 22 shown in FIGS. 2b and 2c, and FIG. 3b is a rear view depicting the exemplary structure of the high beam module 22 of FIG. 3a.

The high beam module 22 in each of the right and the left lamp units 20R and 20L can include: a lens holder 44; a first supporter 46 connecting to the lens holder 44; a second supporter 48 connecting to a radiator 50 having a fun 66; a projector lens 32 having an optical axis AX, a light-emitting surface 32 LS, an incident surface 32IS and a first focus 32F located on substantially the optical axis AX attached to the lens holder 44, and operated as a concave lens, the light-emitting surface 32LS thereof formed in a substantially convex shape, and the incident surface 32IS thereof formed in a substantially planar shape; and a light source 34 configured to emit light, attached by the first supporter 46 and the second supporter 48, and located on substantially the optical axis AX of the projector lens 32, wherein the first focus 32F of the projector lens 32 is located between the light source 34 and the incident surface 32IS of the projector lens 32.

As the light source 34, a white light source including a laser chip and a wavelength converting material can be used. Specifically, a white light source used for a vehicle lighting unit disclosed in Patent document No. 3, which is owned by Applicant of this disclosed subject matter, can be used as the light source 34. A heat generated from the light source 34 can be radiated by the radiator 50 via the second supporter 48 with high efficiency, and also can be radiated by the radiator 50 with higher efficiency by turning the fun 66. As the light source 34, a white light source including at least one light-emitting diode (LED) and a wavelength converting material, a bulb, a halogen bulb and a high-intensity discharge (HID) lamp can be employed.

The above-described high beam module 22 can also include; a first reflector 36 reflecting the light emitted from the light source 31 toward the first focus 32F of the projector lens 32, wherein the light gathered at substantially the first focus 32F of the projector lens 32 enters into the incident surface 32IS and is projected from the light-emitting surface 32 LS of the projector lens 32; and a second reflector 38 also reflecting the light emitted from the light source 31 toward the first focus 32F of the projector lens 32, wherein the light gathered at substantially the first focus 32F of the projector lens 32 enters into the incident surface 32IS and is projected from the light-emitting surface 32 LS of the projector lens 32.

Specifically, each of the first reflector 36 and the second reflector 38 can be formed in a substantially reflective elliptical surface having a first focus and a second focus. Each of the first reflector 36 and the second reflector 38 can gather the light at substantially the first focus 32F of the projector lens 32 by locating the first focuses thereof at substantially the light source 34 and by locating the second focuses thereof at substantially the first focus 32F of the projector 32. The second reflector 38 can be located outer side of the first reflector 36 so as to surround the first reflector 36 as shown in FIG. 38.

In addition, the high beam module 22 can also include: a first shade 40 included in the first supporter 46, the first shade 40 extending from substantially the first focus 32F of the projector lens 32 toward the light source 34 along substantially the optical axis AX of the projector lens 32, and formed as a reflective surface; and a second shade 42 included in the first supporter 46 also, the second shade 42 extending from substantially the first focus 32F of the projector lens 32 in an obliquely upward direction along the incident surface 32IS of the projector lens 32, and formed as a reflective surface.

Moreover, the high beam module 22 can also include a rotary shaft 18RS in the first supporter 46, and an extension of the rotary shaft intersecting with the optical axis AX of the projector lens 32 at a substantially right angle. Accordingly, the swivel setter 15 can rotate the high beam module 22 in the horizontal direction of the high beam module 22 by located the optical axis AX of the projector lens 32 in a horizontal direction with reference to a road. The light emitted from the high beam module 22 can be changed in an intended horizontal direction thereof in accordance with the turning angle output from the system controller 12.

Furthermore, the high beam module 22 can also include a movable shade 43 extending from substantially the first focus 32F of the projector lens 32 in an opposite direction of the first supporter 46 at a substantially right angle with respect to the optical axis AX of the projector lens 32, including a first shading plate 43A and a second shading plate 43B, and each of the first shading plate 43A and the second shading plate 43B, which is moved in a direction substantially perpendicular to the optical axis AX of the projector lens 32 by the shading driver 19. Thereby, the shading driver 19 can vary the shading width of the movable shade 43, which is a space between the first shading plate 43A and the second shading plate 43B.

FIGS. 4a, 4b and 4c are explanatory diagrams depicting relations between each of shading widths of 11 millimeters, 3 millimeters and 1 millimeter of the movable shade and exemplary light distribution patterns, respectively. When the shading width 43W of the movable shade 43, which is a space between the first shading plate 43A and the second shading plate 43B, is 11 millimeters, the light emitted from the light source 34 reflected by the first reflector 36 and the second reflector 38 can almost pass through the shading width 43W between the first shading plate 43A and the second shading plate 43B, and can be emitted from the light-emitting surface 32LS of the projector lens 32 as shown in FIG. 4a.

In this case, a first exemplary light distribution pattern can expand in a rightward and leftward direction and an upward and downward direction in an upward direction of a horizontal line, and can gather at a middle portion in a downward direction of the horizontal line so that the middle portion increases brightness. By projecting the first exemplary light distribution pattern as an additional high beam, which is overlapped with the high beam or the low beam formed by the combination lamp 21 of the lamp unit 20, while the headlight system 1 including the lamp unit 20 can improve a far visibility, the lamp unit 20 can also form a light-emitting line toward the pedestrian of a projecting target from the subject vehicle to provide drivers with a visual guidance.

When the shading width 43W between the first shading plate 43A and the second shading plate 43B of the movable shade 43 is 3 millimeters, a part of the light emitted from the light source 34 reflected by the first reflector 36 and the second reflector 38 may be shaded, and another part of the light can pass through the shading width 43W of the movable shade 43 and can be emitted from the light-emitting surface 32LS of the projector lens 32.

In this case, a second exemplary light distribution pattern cannot largely expand in the rightward and leftward direction and the upward and downward direction in the upward direction of the horizontal line within approximately 5 degrees with respect to the optical axis AX of the projector lens 32, and can gather at a middle portion in the downward direction of the horizontal line so that the middle portion increases brightness as shown in FIG. 4b. By turning the high beam module 22 emitting the second exemplary light distribution pattern in the horizontal direction toward the pedestrian using the swivel structure 18, the headlight system 1 including the high beam module 22 can emit the second exemplary light distribution pattern toward the pedestrian as a marking light, which extends in a vertical direction.

When the shading width 43W between the first shading plate 43A and the second shading plate 43B of the movable shade 43 is 1 millimeter, a part of the light emitted from the light source 34 reflected by the first reflector 36 and the second reflector 38 may be shaded, and another part of the light can pass through the shading width 43W of the movable shade 43 and can be emitted from the light-emitting surface 32LS of the projector lens 32.

In this case, a third exemplary light distribution pattern can gather at a narrower rightward and leftward direction than the upward and downward direction in the upward direction of the horizontal line within approximately 2 degrees with respect to the optical axis AX of the projector lens 32, and can gather at a middle portion in the downward direction of the horizontal line so that the middle portion increases brightness as shown in FIG. 4c. By turning the high beam module 22 emitting the third exemplary light distribution pattern in the horizontal direction toward the pedestrian using the swivel structure 18, the headlight system 1 including the high beam module 22 can emit the third exemplary light distribution pattern toward the pedestrian as a marking light, which extends in a long and thin shape in a vertical direction.

Each of the first, the second and the third exemplary light distribution patterns shown in FIG. 4a to FIG. 4c can be a typical light distribution pattern. The vehicle headlight system 1 can provide various favorable light distribution patterns in accordance with traffic conditions, and also can vary the favorable light distribution pattern in a continuous fashion in accordance with shifting traffic conditions. FIG. 5 is an explanatory diagram depicting exemplary light distribution patterns used as a marking light, wherein a pedestrian P1 and another pedestrian P2 exist in a forward direction of the subject vehicle 30 incorporating the headlight system 1 moving forward.

When the pedestrian P1 exists at a sidewalk 110 meters away from the subject vehicle, the headlight system 1 can project a light distribution pattern having a long and thin shape and a light-emitting angle of an approximately 1 degree, which corresponds to a light-emitting width of 1.7 meters, toward the pedestrian P1 as a first marking light MB1 because the pedestrian P1 is a relative far away from the subject vehicle. When the pedestrian P2 exists at a sidewalk 25 meters away from the subject vehicle, the headlight system 1 can a light distribution pattern having a relative large shape and a light-emitting angle of an approximately 4.6 degrees, which corresponds to a light-emitting width of 2.2 meters, as a second marking light M2, because the pedestrian P2 is located a relative near position from the subject vehicle.

The light-emitting width of the marking light can set up in a variable range of, for example, 1 degree to 10 degrees according to a distance between the pedestrian and the subject vehicle 30 and a predetermined light-emitting area width. With respect to a range of a distance to emit the marking light, for example, a wide range of 25 meters to 110 meters can be set up with reference to the subject vehicle 30.

The above-described distances correspond to stopping sight distances of 30 Km/hour to 90 Km/hour.

Figure 6:
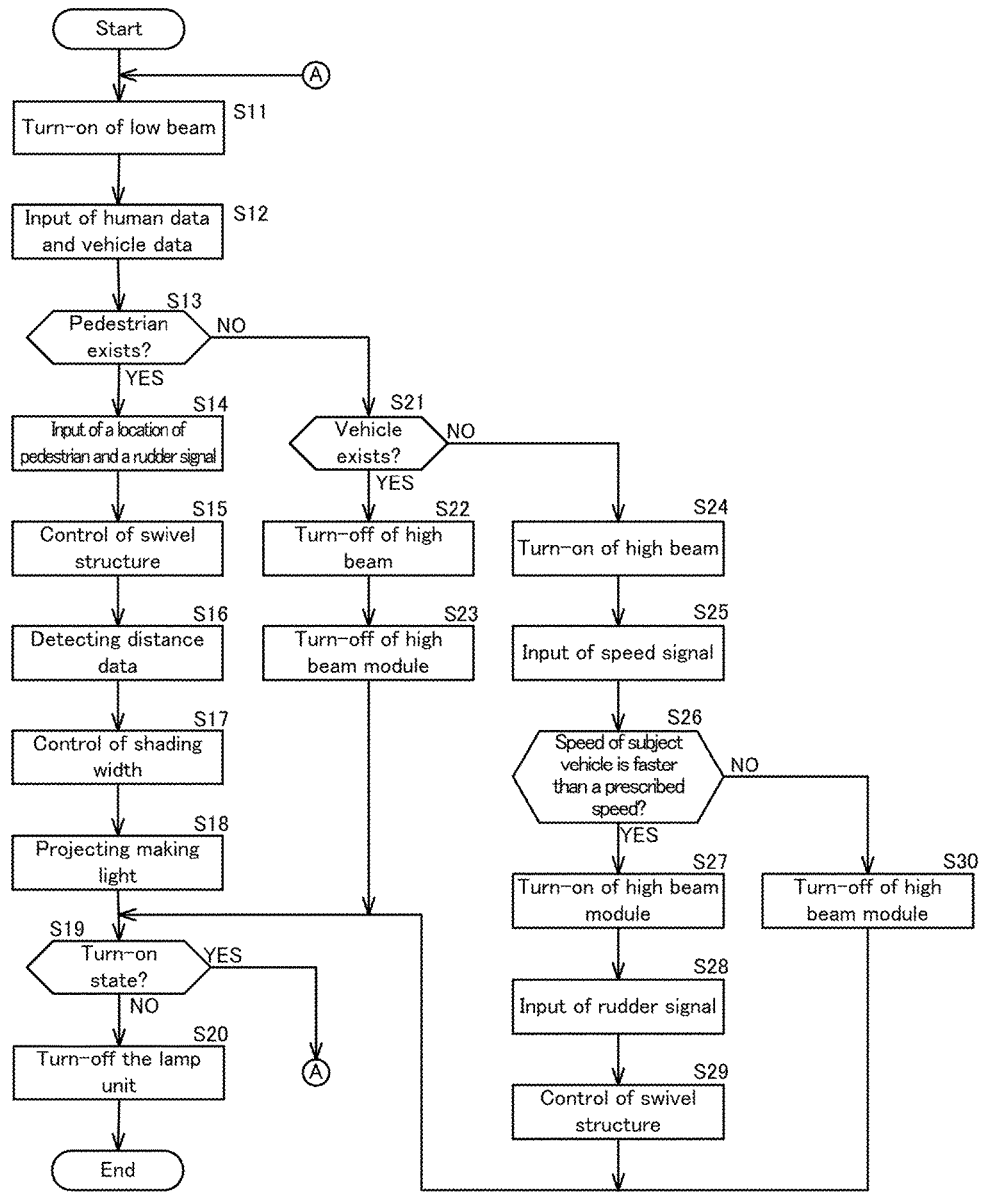
FIG. 6 is a flow chart for an exemplary operation of the vehicle headlight system shown in FIG. 1.
Figure 7A:
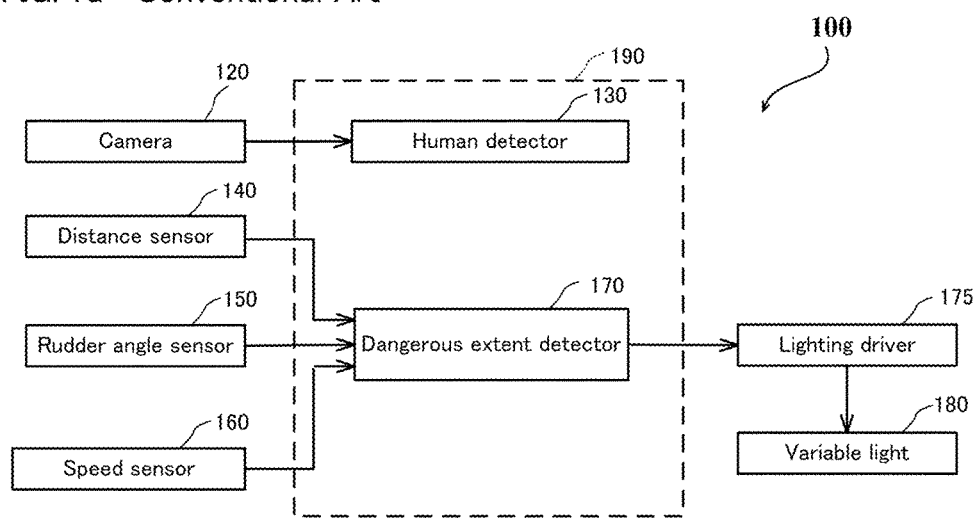
FIG. 7a is a block diagram showing a conventional alerting light-emitting apparatus.
Figure 7B:
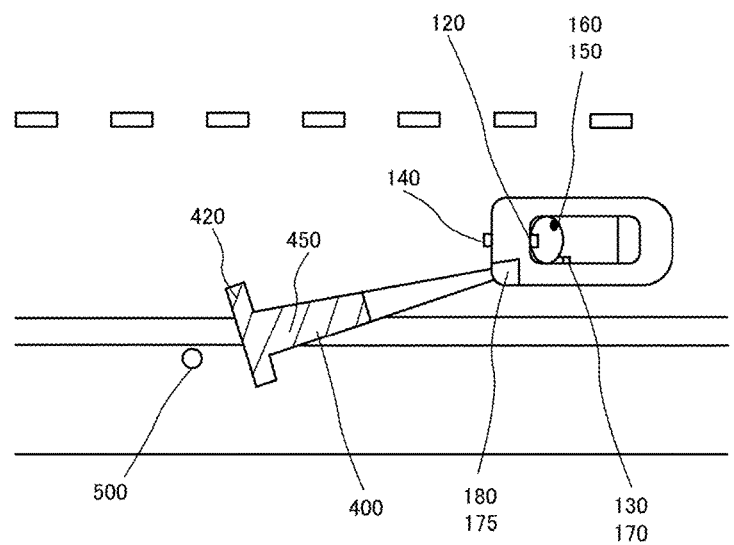
FIG. 7b is an explanatory view showing a light-emitting pattern projected by the conventional alerting light-emitting apparatus.

Next, an exemplary operation of the headlight system 1 will now be described with reference to a flow chart shown in FIG. 6. When detecting a turn-on state of a headlight switch in accordance with a switching signal output from the subject vehicle 30, the light-emitting controller 17 turns on the low beam of the lamp unit 20 (Step: S11). Specifically, the light-emitting controller 17 can output a control signal to the lamp unit 20 for emitting the low beam of the combination lamp 21 of the lamp unit 20. The headlight controller 2 can input the human data and the vehicle data output from the image processing circuit 11 (Step: S12).

The pedestrian detector 13 can detect whether at least one pedestrian exists or not in the forward direction of the subject vehicle 30 in accordance with the human data (Step: S13). When the pedestrian exists (Step: Yes of S13), the swivel setter 15 can input the location of the pedestrian from the human data, and also can input the rudder signal output from the subject vehicle (Step: S14). The swivel setter 15 can control the swivel structure 18 in accordance with the location of the pedestrian and the rudder signal (Step: S15).

Specifically, the swivel setter 15 can determine the turning angle to turn the high beam module 22 in the horizontal direction of a road for emitting the marking light toward the location of the pedestrian with reference to the subject vehicle 30, and can output the turning angle to the swivel structure 18. The swivel structure 18 can rotate the high beam module 22 in accordance with the turning angle output from the swivel setter 15. In this case, when an error occurs due to the rudder signal, each of the swivel setter 15 and the swivel structure 18 can revise the turning angle in accordance with the rudder signal.

The shading width setter 16 can detect the relative distance between the pedestrian and the subject vehicle 30 in accordance with the human data output from the image processing circuit 11, and can determine the shading width 43W of the movable shade 43 in the high beam module 22 of the lamp unit 20 in accordance with the distance data. The shading width setter 16 can also output said shading width data to the shading driver 19 (Step: S16). The shading driver 19 can control the shading width 43W of the movable shade 43 in the high beam module 22 in accordance with the shading width data output from the shading width setter 16 (Step: S17).

Specifically, the shading width setter 16 can detect the relative distance between the pedestrian and the subject vehicle 30 by continuously detecting a size of the pedestrian. When the size of the pedestrian is small, the shading width setter 16 can detect that the relative distance is far away from the subject vehicle. When the size of the pedestrian become large, the shading width setter 16 can detect that the relative distance is near from the subject vehicle 30.

Additionally, the shading driver 19 can set up the shading width 43W between the first shading plate 43A and the second shading plate 43B of the movable shade 43 as described with reference to FIG. 4a to FIG. 4c. In this case, the shading driver 19 can set up the shading width 43W by calculating a relational expression between the shading width data and the distance data, and also can set up the shading width 43W by referring a table, in which relational data between the shading width data and the distance data is tabulated.

Next, the light-emitting controller 17 can control to emit the high beam module 22 of the lamp unit 20, and thereby the high beam module 22 can project the marking light toward the pedestrian (Step: S18). Then, the light-emitting controller 17 can detect whether the turn-on state of the headlight switch is or not in accordance with the switching signal output from the subject vehicle 30 keeps or not (Step: S19). When the turn-on state of the headlight switch keeps, the headlight system 1 can repeat the above-described operations by returning Step S11 (Step: Yes of S19). When the turn-on state of the headlight switch changes a turn-off state, the light-emitting controller 17 can turn off the combination lamp 21 including the light-emitting structure for the high beam and the low beam and the high beam module 22 of the lamp unit 20 (Step: S20).

In the above-described Step S13, when the pedestrian detector 13 detects that the pedestrian does not exist (Step: No of S13), the forward vehicle detector 14 can detect whether the at least one forward vehicle 31 exists or not in the forward direction of the subject vehicle in accordance with the vehicle data output from the image processing circuit 11 (Step: S21). When the vehicle exists (Step: Yes of S21), the light-emitting controller 17 can turn off the high beam in the combination lamp 21 of the lamp unit 20 (Step: S22), and also can turn off the high beam module 22 (Step: S23). The headlight system 1 can carry out the above-described process of Step S19 according to the flow chart of FIG. 6.

Specifically, the light-emitting controller 17 can output a turn-off signal to the lamp unit 20 to turn off the high beam in the combination lamp 21 of the lamp unit 20, and also can output the turn-off signal to the lamp unit 20 to turn off the high beam module 22 of the lamp unit 20. Accordingly, the vehicle headlight system 1 of the disclosed subject matter can prevent the lamp unit 20 from emitting a glare type light to the forward vehicle. The system controller 12 can also detect the relative distance between the forward vehicle and the subject vehicle 30 by continuously detecting a size of the forward vehicle, brightness of a headlight, a tail lamp and the like of the forward vehicle, etc.

When a color camera (e.g., CCD camera including a color filter) photographs color image data as the camera 10, the system controller 12 can easily detect whether the forward vehicle is an oncoming vehicle or a frontward vehicle moving forward in the forward direction of the subject vehicle 30 because the image processing circuit 11 may distinguish the headlight having a substantially white color tone of the oncoming vehicle from the tail lamp having a substantially red color tone of the frontward vehicle. Additionally, the oncoming vehicle has features such that may approach toward the subject vehicle 30 on an oncoming lane located adjacent a driving lane, and such that an approaching speed should be fast as compared with the forward vehicle driving forward on a same driving lane, on which the subject vehicle 30 drives.

On the other hand, the forward vehicle driving forward on the same driving lane may have features such that an amount of movements in the horizontal direction with respect to the driving lane may be small and such that an approaching speed between the forward vehicle and the subject vehicle should be very slow as compared with the oncoming vehicle. Accordingly, the system controller 12 may be easy to detect whether the at least one forward vehicle 31 is an oncoming vehicle or not by using a plurality of the above-described features.

When the forward vehicle 31 does not exists (Step: No of S21), the light-emitting controller 17 can output a turn-on signal to the lamp unit 20, and can turn on the high beam in the combination lamp 21 of the lamp unit 20 (Step: S24). Additionally, the light-emitting controller 17 can input the speed signal of the subject vehicle output from the subject vehicle (Step: S25). The light-emitting controller 17 can detect whether the speed of subject vehicle 30 is faster than a prescribed speed (e.g., 60 Km/hour) or not in accordance with the speed signal output from the subject vehicle 30 (Step: S26).

When the speed of subject vehicle 30 is faster than the prescribed speed (Step: Yes of S26), the light-emitting controller 17 can output a turn-on signal to the lamp unit 20, and can turn on the high beam module 22 of the lamp unit 20 (Step: S27). In this case, a high beam pattern projected from the high beam in the combination lamp 21 may be overlap with the first exemplary light distribution pattern projected from the high beam module 22 shown in FIG. 4a. Therefore, the vehicle headlight system 1 of the disclosed subject matter can also provide a favorable light distribution pattern to drive at a high speed.

Additionally, the swivel setter 15 can input the rudder signal output from the subject vehicle 30 (Step: S28), and can control the swivel structure 18 in accordance with the rudder signal (Step: S29). Thereby, the swivel structure 18 can vary a light-emitting direction of the high beam module 22 of the lamp unit 20 in accordance with a moving direction of the subject vehicle 30. Accordingly, the vehicle headlight system 1 can maintain the favorable light distribution pattern to drive at a high speed even when the driving lane of the subject vehicle 30 varies a curve road. Then, the headlight system 1 can carry out the above-described process in Step S19.

When the speed of subject vehicle 30 is not faster than the prescribed speed (Step: No of S26), the light-emitting controller 17 can output a turn-off signal to the lamp unit 20, and can turn off the high beam module 22 of the lamp unit 20 (Step: S30). The headlight system 1 can carry out the above-described process in Step S19. Accordingly, the vehicle headlight system 1 can provide a favorable light distribution pattern so as to prevent emitting a glare type light to other forward vehicles at a low speed.

According to the exemplary vehicle headlight system, the exemplary vehicle headlight system can emit favorable light distribution patterns as the marking light while the system controller 12 associates the shading driver 19 with the shading width setter 16 therein by using the high beam module 22 so that the marking light narrows with increasing distance from the subject vehicle 30 to the pedestrian, and also can accurately emit the favorable light distribution patterns as the marking light toward the pedestrian by turning the high beam module 22 in the horizontal direction using the swivel structure 18.

Moreover, when the pedestrian and the forward vehicle 31 do not exist in the forward direction of the subject vehicle 30, the exemplary vehicle headlight system can also provide favorable light distribution patterns to safely drive at night by overlapping the light distribution pattern projected from the high beam module 22 with each of the light distribution patterns for the high beam and the low beam. When the at least one forward vehicle 31 exists in the forward direction of the subject vehicle, the vehicle headlight system 1 can prevent the lamp unit 20 from emitting a glare type light to oncoming vehicles and vehicles moving forwards in the forward direction of the subject vehicle 30 in accordance with various traffic conditions as described above.

Furthermore, the lamp unit 20 including the high beam module 22 can be used as the right and left headlight for the headlight controller 2, and can be easy to reduce a size of the headlight with a simple structure. Thus, the disclosed subject matter can provide vehicle headlight systems 1 using the headlight controller 2 and the lamp unit 20, which can provide favorable light distribution patterns that can be easy to drive at night for not only the subject vehicle but also vehicles traveling in the forward direction of the subject vehicle 30 by utilizing the characteristics of the headlight controller 2 and the optical unit 20, and which can expand possibilities for design so as to be able to harmonize with various vehicular designs.

Various modifications of the above disclosed embodiments can be made without departing from the spirit and scope of the presently disclosed subject matter. For example, cases where the lamp unit 20 is used as the right and left headlight in the marking light. However, the lamp unit 20 is not limited to this structure and can integrally incorporate a turn signal lamp, a position lamp, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle headlight system, comprising:
  a lamp unit including a high beam module, and configured to be attached to a right and left front of a subject vehicle, and the high beam module of the lamp unit including
    a projector lens having an optical axis, an incident surface and a first focus located on substantially the optical axis of the projector lens,
    a light source configured to emit light, and located on substantially the optical axis (AX) of the projector lens, wherein the first focus of the projector lens is located between the light source and the incident surface of the projector lens,
    a first reflector configured to reflect the light emitted from the light source toward the first focus of the projector lens,
    a movable shade extending from substantially the first focus of the projector lens in a direction of the first reflector at a substantially right angle with respect to the optical axis of the projector lens, and including a first shading plate, a second shading plate and a shading width located the first shading plate and the second shading plate, and configured to vary the shading width,
    a first supporter connecting the projector lens, the light source, the first reflector and the movable shade, and
    a rotary shaft included in the first supporter, and an extension of the rotary shaft intersecting with the optical axis of the projector lens at a substantially right angle;
  a camera having an optical axis being located adjacent the subject vehicle, configured to photograph at least one pedestrian and at least one forward vehicle located in a frontward direction of the subject vehicle, and the camera being configured to output the at least one pedestrian and the at least one forward vehicle photographed by the camera as image data;
  an image processing circuit configured to detect the at least one pedestrian and the at least one forward vehicle in accordance with the image data output from the camera, configured to generate human locating data of the at least one pedestrian and vehicle locating data of the at least one forward vehicle with respect to the optical axis of the camera, and being configured to output the human locating data and the vehicle locating data vehicle as human data and vehicle data, respectively;

a system controller including a pedestrian detector, a forward vehicle detector, a swivel setter, a shading width setter and a light-emitting controller, the pedestrian detector configured to input the human data output from the image processing circuit, and configured to determine whether the at least one pedestrian exists or not in accordance with the human data, the forward vehicle detector configured to input the vehicle data output from the image processing circuit, and configured to determine whether the at least one forward vehicle exists or not in accordance with the vehicle data, the swivel setter configured to configured to input the human data output from the image processing circuit, and configured to determine a turning angle of the rotary shaft of the high beam module as swivel data in accordance with the human data, and configured to output the swivel data, the shading width setter configured to configured to input the human data output from the image processing circuit, and configured to determine the shading width of the movable shade as shading data in accordance with the human data, and configured to output the shading data, and the light-emitting controller configured to input a rudder signal, a speed signal and a switching signal output from the subject vehicle, configured to generate a light-emitting driving signal in accordance with the rudder, the speed signal and the switching signal, and configured to output a light-emitting driving signal to the lamp unit;

a swivel structure configured to input the swivel data output from the swivel setter of the system controller, and configured to rotate the rotary shaft of the high beam module of the lamp unit in accordance with the swivel data; and a shading driver configured to input the shading data output from the shading width setter, and configured to set up the shading width of the movable shade of the high beam module of the lamp unit.

2. The vehicle headlight system according to claim 1, further comprising:

a second reflector included in the high beam module, formed in a substantially reflective elliptical surface having a first focus and a second focus, configured to gather the light emitted from the light source at substantially the first focus of the projector lens by locating the first focuses of the second reflector at substantially the light source and by locating the second focus of the second reflector at substantially the first focus of the projector, and located outer side of the first reflector of the high beam module so as to surround the first reflector.

3. The vehicle headlight system according to claim 1, further comprising:

a low beam lamp included in the lamp unit; and a high beam lamp included in the lamp unit.

4. The vehicle headlight system according to claim 3, wherein when the system controller detects that the pedestrian and the forward vehicle do not exist in the forward direction of the subject vehicle, the lamp unit overlaps a light distribution pattern projected from the high beam module with light emitted from either the high beam lamp or the low beam lamp.

5. The vehicle headlight system according to claim 4, wherein when the system controller detects that a vehicle speed of the subject vehicle is slower than a predetermined speed, the lamp unit stops the high beam module from emitting.

6. The vehicle headlight system according to claim 3, wherein when the system controller detects that the forward vehicle exist in the forward direction of the subject vehicle, the lamp unit stops the high beam module from emitting.

7. The vehicle headlight system according to claim 1, wherein the shading width setter narrows the shading width of the movable shade of the high beam module with an increasing relative distance of a pedestrian with respect to the subject vehicle output from the image processing circuit.

8. The vehicle headlight system according to claim 1, wherein the camera is a color camera, which photographs color image data.

9. The vehicle headlight system according to claim 1, wherein the light source of the high beam module includes at least one of a laser chip and at least one light-emitting diode and a wavelength converting material.

10. The vehicle headlight system according to claim 1, wherein the optical axis of the camera is located in a substantially parallel direction with each of the optical axes of the projector lenses of the high beam modules attached to the right and left front of the subject vehicle.

* * * * *